(12) United States Patent
Zou

(10) Patent No.: US 9,008,500 B2
(45) Date of Patent: Apr. 14, 2015

(54) PROTECTION SYSTEM, METHOD AND APPARATUS FOR OPTICAL NETWORK

(75) Inventor: Hongbing Zou, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 561 days.

(21) Appl. No.: 13/259,758

(22) PCT Filed: Sep. 28, 2009

(86) PCT No.: PCT/CN2009/074290
§ 371 (c)(1),
(2), (4) Date: Dec. 22, 2011

(87) PCT Pub. No.: WO2010/148599
PCT Pub. Date: Dec. 29, 2010

(65) Prior Publication Data
US 2012/0281978 A1 Nov. 8, 2012

(30) Foreign Application Priority Data

Jun. 26, 2009 (CN) .......................... 2009 1 0142243

(51) Int. Cl.
*G02F 1/00* (2006.01)
*H04J 14/02* (2006.01)
*H04B 10/032* (2013.01)
*H04Q 11/00* (2006.01)

(52) U.S. Cl.
CPC ......... *H04J14/0289* (2013.01); *H04J 14/0291* (2013.01); *H04J 14/0294* (2013.01); *H04Q 11/0062* (2013.01); *H04Q 2011/0081* (2013.01)

(52) U.S. Cl.
CPC .......... *H04J 14/0295* (2013.01); *H04B 10/032* (2013.01); *H04J 14/0221* (2013.01);
(Continued)

(58) Field of Classification Search
CPC .. H04B 10/032; H04B 10/035; H04B 10/038; H04J 14/0287; H04J 14/0289; H04J 14/029; H04J 14/0291; H04J 14/0293; H04J 14/0294; H04J 14/0295

USPC ......... 398/3, 5, 1, 2, 4, 10, 13, 17, 20, 33, 38, 398/45, 48, 49, 50, 56, 57, 59, 7, 8, 79; 370/254, 217, 220, 228, 392, 216, 390
See application file for complete search history.

(56) References Cited

U.S. PATENT DOCUMENTS

| 7,697,455 | B2 * | 4/2010 | Sadanada ...................... 370/254 |
| 8,116,623 | B2 * | 2/2012 | Chung et al. ...................... 398/3 |
| 2009/0257751 | A1 * | 10/2009 | Sadananda et al. ............. 398/83 |

FOREIGN PATENT DOCUMENTS

| CN | 1859157 A | 11/2006 |
| CN | 1874201 A | 12/2006 |
| JP | 2004040726 A | 2/2004 |

OTHER PUBLICATIONS

International Search Report for PCT/CN2009/074290 dated Mar. 19, 2010.

*Primary Examiner* — Hanh Phan
(74) *Attorney, Agent, or Firm* — Ling Wu; Stephen Yang; Ling and Yang Intellectual Property

(57) ABSTRACT

The invention discloses a system, a method and an apparatus for optical network protection. The system includes: an output control apparatus for obtaining protection mode information configured by a system and controlling an input signal to be output from a set line corresponding to said protection mode information; and a detection control apparatus for detecting powers of signals transmitted on an active line and on a standby line, if it is determined that the active line is abnormal and the standby line is normal according to detection results, then controlling the input signal to be output from a protection line corresponding to the protection mode information; if it is determined that the active line is normal, or that the active line and the standby line are abnormal according to the detection result, then controlling the input signal to be output from a set line corresponding to the protection mode information.

13 Claims, 5 Drawing Sheets

PROTECTION SYSTEM, METHOD AND APPARATUS FOR OPTICAL NETWORK

TECHNICAL FIELD

The invention relates to the technical field of the optical transmission and, in particular, to a system, a method and an apparatus for optical network protection.

BACKGROUND OF THE RELATED ART

The requirement for reliability of transmission in a Wavelength Division Multiplexing (WDM) long-distance transmission network is very high, and thus various protection techniques of the optical path level and the optical multiplexing level are generally used so that a service transmitted on an active line can be switch to a protection line (i.e., a standby line) via a protection apparatus when an abnormal failure occurs in a normal active line, such as, fiber breaking caused by construction and so on, thereby not affecting users' use as far as possible.

In various optical transmission systems, the protection system is generally divided into two categories: optical layer protection and circuit layer protection, wherein optical layer protection mainly achieves to switch an optical path via various optical devices, and makes use of a standby optical path to substitute an active line where a fault occurs for transmitting service, thereby achieving the purpose of protecting user's service. Currently, the main protection modes often applied by optical layer protection are a linear 1+1 protection mode and a linear 1:1 protection mode, wherein:

in a 1+1 protection mode, a standby line is reserved for each active line, and a service transmitted on an active line can be timely switched onto a standby line for transmission when a fault occurs in the active line. This protection mode has a simple structure and works efficiently and reliably. However, the 1+1 protection mode also has a plurality of inherent deficiencies at the same time, that is, it needs to reserve a standby line for an active line, and the a standby line is required to be in an available state whenever necessary and cannot transmit other additional services due to its protection feature, thereby causing wastes of bandwidth resources and a very low utilization ratio of the bandwidth.

In a 1:1 protection mode, a standby line is reserved for an active line, but it is different from a 1+1 protection mode, and since additional services can be transmitted in a standby line in 1:1 protection, wastes of bandwidths are reduced to some extent. However, in 1:1 protection, when a fault occurs in an active line, it needs to interrupt an additional service transmitted on a standby line and switch a service transmitted on the active line to the standby line for transmission, which gives rise to the delay or loss of the service transmitted on the standby line and the lower success rate of service transmission, thereby affecting transmission performance of the whole system and user's use feeling to service.

In practical applications, it often needs to use different protection modes according to different features of services to be transmitted, for example, as for a service having a high requirement for the service transmission success rate, it is hoped that a 1+1 protection mode is used so as to ensure the success rate of service transmission; as for a service having a low requirement for the service success rate, it is hoped that a 1:1 protection mode is used so as to improve the utilization rate of bandwidth. To sum up, currently a protection mode applied in an optical transmission system is stationary, that is, either a 1+1 protection mode or a 1:1 protection mode is used, and it is impossible to select a protection mode according to different features of services to be transmitted, resulting in a problem that transmission requirements of service cannot be satisfied.

SUMMARY OF THE INVENTION

In view of this, the invention provides a system, a method and an apparatus for optical network protection. Applications of this technical scheme can flexibly select a protection mode with respect to features of the service to be transmitted and thereby can satisfy different transmission requirements of different services.

The invention provides a system for optical network protection, which comprises:

an output control apparatus, which is configured to: obtain protection mode information configured by a system and control an input signal to be output from a set line corresponding to said protection mode information; and a detection control apparatus, which is configured to: obtain the protection mode information configured by the system and respectively detect powers of signals transmitted on an active line and on a standby line, and control the input signal to be output from a protection line corresponding to said protection mode information if that said active line is abnormal and said standby line is normal is determined according to a detection result; control said input signal to be output from a set line corresponding to the protection mode information if that said active line is normal is determined or that said active line and said standby line are abnormal according to the detection result is determined.

In the above system, said output control apparatus is further configured to: control a signal from an input end of the active line to be output respectively from said active line and said standby line as the protection mode information that is obtained is a linear 1+1 protection mode; and to control the signal from the input end of the active line to be output from the active line and the signal from the input end of the standby line to be output from the standby line as the protection mode information that is obtained is a linear 1:1 protection mode.

In the above system, when controlling said input signal to be output from the protection line corresponding to said protection mode information, said detection control apparatus is further configured to: control the signal transmitted on said standby line to be output from said active line as the protection mode information that is obtained is a linear 1+1 protection mode; and to control the signal transmitted on said active line to be output from said standby line as the protection mode information that is obtained is a linear 1:1 protection mode;

when controlling said input signal to be output from the set line corresponding to said protection mode information, said detection control apparatus is further configured to: control the signal transmitted on said active line to be output from said active line as the protection mode information that is obtained is the linear 1+1 protection mode; and to control the signal transmitted on said active line to be output from said active line and the signal transmitted on said standby line to be output from said standby line as the protection mode information that is obtained is the 1:1 protection mode.

The present invention further provides a method for optical network protection, which comprises:

obtaining protection mode information configured by a system; and controlling an input signal to be output based on a set line corresponding to said protection mode information.

In the above method, the step of controlling the input signal to be output based on the set line corresponding to said protection mode information comprises: when the protection mode information that is obtained is a linear 1+1 protection mode, controlling a signal from an input end of an active line to be output respectively from the active line and a standby line; and when the protection mode information that is obtained is a linear 1:1 protection mode, controlling said signal from the input end of the active line to be output from said active line and said signal from the input end of the standby line to be output from said standby line.

The present invention further provides a method for optical network protection, which comprises:

obtaining protection mode information configured by a system and respectively detecting powers of signals transmitted on an active line and a standby line; and if that said active line is abnormal and said standby line is normal is determined according to a detection result, controlling an input signal to be output from a protection line corresponding to said protection mode information; and if that said active line is normal, or that said active line and said standby line are abnormal is determined according to the detection result, controlling said input signal to be output from a set line corresponding to said protection mode information.

In this method, the step of controlling the input signal to be output from the protection line corresponding to said protection mode information comprises: if the protection mode information that is obtained is a linear 1+1 protection mode, controlling the signal transmitted on said standby line to be output from said active line; and if the protection mode information that is obtained is a linear 1:1 protection mode, controlling the signal transmitted on said active line to be output from said standby line.

In this method, the step of controlling said input signal to be output from the set line corresponding to said protection mode information comprises: if the protection mode information that is obtained is a linear 1+1 protection mode, controlling the signal transmitted on said active line to be output from said active line; and if the protection mode information that is obtained is a linear 1:1 protection mode, controlling the signal transmitted on said active line to be output from said active line and the signal transmitted on said standby line to be output from said standby line.

The present invention further provides an apparatus for optical network protection, which comprises: a control unit and a switching unit; wherein said control unit is configured to: obtain protection mode information configured by a system and instruct said switching unit to control an input signal to be output from a set line corresponding to said protection mode information;

said switching unit is configured to: control an output of said input signal according to an instruction of said control unit.

In the above apparatus, when instructing said switching unit to control the input signal to be output from the set line corresponding to said protection mode information, said control unit is further configured to: instruct said switching unit to control a signal from an input end of an active line to be output respectively from the active line and a standby line as the protection mode information that is obtained is a linear 1+1 protection mode; and instruct said switching unit to control the signal from the input end of the active line to be output from said active line and a signal from an input end of the standby line to be output from said standby line as the protection mode information that is obtained is a linear 1:1 protection mode.

In the above apparatus, said switching unit comprises an optical coupler module and an optical switch module;

said control unit is further configured to: output a signal split instruction to said optical coupler and a connection instruction to said optical switch module as the protection mode information that is obtained is the linear 1+1 protection mode; and to output a signal transmission instruction respectively to said optical coupler module and said optical switch module as the protection mode information that is obtained is the linear 1:1 protection mode;

said optical coupler module is configured to: control said signal from the input end of the active line to be split into two path, output one path via said active line and provide the other path to said optical switch module when receiving the signal split instruction of said control unit; and to output said signal from the input end of the active line via said active line when receiving the signal transmission indication of said control unit;

said optical switch module is configured to: open a connection with said optical coupler module and output a signal transmitted by said optical coupler module via said standby line when receiving the connection instruction of said control unit; and to output said signal from the input end of the standby line via said standby line when receiving the signal transmission instruction of said control unit.

In the above apparatus, said control unit can be further configured to: not control the optical coupler module according to the protection mode information that is obtained, and only transmit said signal from the input end of the active line to said optical coupler module;

correspondingly, said optical coupler module is configured to: voluntarily split the signal that is received into two paths, output one path via said active line and provide the other path to said optical switch module, and output the signal provided to said optical switch module from said standby line when establishing the connection said optical switch module and said optical coupler module and make the signal provided to said optical switch module lost as there is no connection established between said optical switch module and said optical coupler module.

The present invention further provides an apparatus for optical network protection, which comprises: a control unit, a power detection unit, and a switching unit; wherein said control unit is configured to: obtain protection mode information configured by a system and instruct said power detection unit to respectively detect powers of signals transmitted on an active line and a standby line, and instruct said switching unit to control an signal to be output from a protection line corresponding to said protection mode information if that said active line is abnormal and said standby line is normal is determined according to a detection result of said power detection unit; instruct said switching unit to control said input signal to be output from a set line corresponding to said protection mode information if that said active line is normal or that said active line and said standby line are abnormal is determined according to the detection result of said power detection unit;

said power detection unit is configured to: detect powers of signals transmitted on said active line and on said standby line according to an instruction of said control unit;

said switching unit is configured to: control an output of said input signal according to an instruction of said control unit.

In the above apparatus, when instructing said switching unit to control the input signal to be output from the protection line corresponding to said protection mode information, said control unit is further configured to: instruct said switching unit to control the signal transmitted on said standby line to be output from said active line as the protection mode information that is obtained is a linear 1+1 protection mode; and instruct said switching unit to control the signal transmitted on said active line to be output from said standby line as the protection mode information that is obtained is a linear 1:1 protection mode;

when instructing said switching unit to control said input signal to be output from the set line corresponding to said protection mode information, said control unit is further configured to: instruct said switching unit to control the signal transmitted on said active line to be output from said active line as the protection mode information that is obtained is the linear 1+1 protection mode; and instruct said switching unit to control the signal transmitted on said active line to be output from said active line and the signal transmitted on said standby line to be output from said standby line as the protection mode information that is obtained is the linear 1:1 protection mode.

In the above apparatus, said power detection unit comprises: a main line power detection module and a standby line power detection module;

said switching unit comprises a first optical switch module and a second optical switch module;

said control unit is further configured to: send a power detection instruction respectively to said main line power detection module and said standby line power detection module; if that said active line is abnormal and said standby line is normal is determined according to detection results of said main line power detection module and said standby line power detection module, output a first connection instruction for connecting said standby line power detection module and said first optical switch module to said second optical switch module as the protection mode information that is obtained is a linear 1+1 protection mode and output a second connection instruction for connecting said main line power detection and said second optical switch module to said first optical switch module as the protection mode information that is obtained is a linear 1:1 protection mode; if that said active line is normal, or that said active line and said standby line are abnormal is determined according to the detection results of said main line power detection module and said standby line power detection module, output a third connection instruction for connecting said main line power detection module to said first optical switch module as the protection mode information that is obtained is the linear 1+1 protection mode and output the third connection instruction for connecting said main line power detection module to said first optical switch module and a fourth connection instruction for connecting said standby line power detection module to said second optical switch module as the protection mode information that is obtained is the linear 1:1 protection mode;

said main line power detection module is configured to: detect the power of the signal transmitted on said active line according to the power detection instruction sent by said control unit;

said standby line power detection module is configured to: detect the power of the signal transmitted on said standby line according to the power detection instruction sent by said control unit;

said first optical switch module is configured to: open connections with said main line power detection module and said second optical switch module and output the signal on the active line transmitted by said main line power detection module from said standby line via said second optical switch module according to said second connection instruction output by said control unit, and to open the connection with said main line power detection module and output the signal on said active line transmitted by said main line power detection module from said active line according to said third connection instruction output by said control unit;

said second optical switch module is configured to: open connections with said standby line power detection module and said first optical switch module and output said signal from said standby line from said active line according to said first connection instruction output by said control unit; and to open the connection with said standby line power detection module and output said signal on said standby line from said standby line according to said fourth instruction output by said control unit.

By means of the technical scheme provided by the invention, an output control end obtains protection mode information configured by system and then controls an input signal to be output based on a set line corresponding to the protection mode information according to the obtained protection mode information, so that it is possible to select a corresponding transmission line according to a protection mode configured by the system and achieve the object to implement to flexibly select a protection mode; an detection control end first obtains protection mode information configured by the system and respectively detects powers of signals transmitted on an active line and a standby line, and timely switches a service to the protection line corresponding to the protection mode for transmission according to the obtained protection mode information as it is determined that the active line is abnormal and the standby line is normal, and thus it ensures the success rate of service transmission on the active line. The apparatus and the system provided by the invention are able to support different protection modes so that different protection modes can be configured according to different features of services to be transmitted in system configuration, thereby satisfying transmission demands of different services.

BRIEF DESCRIPTION OF DRAWINGS

The accompanying drawings are provided for further understanding on the invention and compose a part of the description, which are used for explaining the invention in combination with the embodiments of the invention and do not form limitation to the invention. In the drawings.

PREFERRED EMBODIMENTS OF THE PRESENT INVENTION

A system, a method and an apparatus for optical network protection are provided in embodiments of this invention.

Based on the technical scheme provided in the embodiments of this invention, it is possible to flexibly select a protection mode based on features of services to be transmitted, thereby satisfying different demands of different services.

The embodiments and the features in the embodiments of this invention can be combined with each other in the case of no conflict.

The followings make explanations on the preferred embodiments of this invention in combination with the drawings of the description. It should be understood that the preferred embodiments described here are only used for introducing and explaining this invention but not for defining this invention.

According to one embodiment of this invention, first a system for optical network protection is provided, which is able to flexibly select a protection mode with respect to features of services, thereby satisfying transmission demands of different services.

Figure 1:
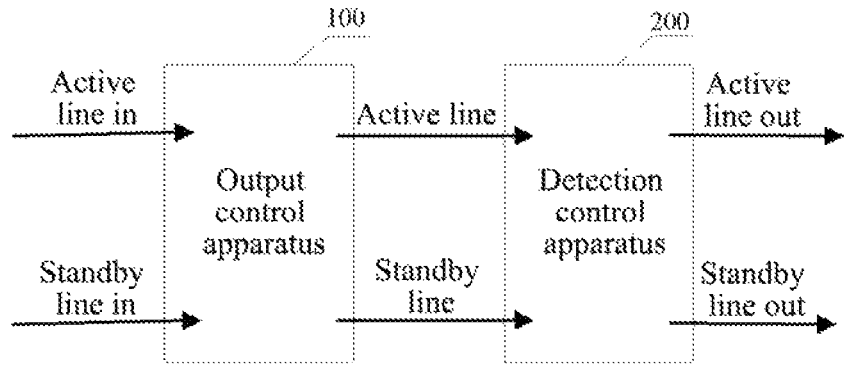
FIG. 1 is a schematic diagram showing the structure of the optical network protection system provided in one embodiment of this invention.

FIG. 1 is a schematic diagram showing the structure of the optical network protection system provided based on one embodiment of this invention. As shown in FIG. 1, the system comprises:

an output control apparatus 100 and a detection control apparatus 200; wherein the output control apparatus 100 is used to obtain protection mode information configured by the system, and control an input signal to be output from a set line corresponding to the obtained protection mode information according to the obtained protection mode information.

Specifically, the output control apparatus 100 implementing to control an input signal to be output from a set line corresponding to the obtained protection mode information according to the obtained protection mode information comprises:

when the protection mode information obtained by the output control apparatus 100 is a linear 1+1 protection mode, controlling a signal from the input end of the active line to be output respectively from the active line and a standby line; when the protection mode information obtained by the output control apparatus is a 1:1 mode, controlling a signal from an input end of the active line to be output from the active line and controlling a signal from an input end of the standby line to be output from the standby line.

The detection control apparatus 200 is used to obtain protection mode information configured by the system and respectively detect powers of signals transmitted on an active line and on a standby line, and if it is determined that the active line is abnormal and the standby line is normal based on the detection result, then control an input signal to be output from a protection line corresponding to the protection mode information according to the obtained protection mode information; if it is determined that the active line is normal, or that the active line and the standby line are abnormal based on the detection result, then control an input signal to be output from a set line corresponding to the protection mode information according to the obtained protection mode information.

Specifically, the detection control apparatus 200 implementing to control an input signal to be output from a protection line corresponding to the protection mode information according to the obtained protection mode information comprises:

when the protection mode information obtained by the detection control apparatus 200 is a linear 1+1 protection mode, controlling a signal transmitted on a standby line to be output from an active line; when the obtained protection mode information is a linear 1:1 protection mode, control a signal transmitted on an active line to be output from a standby line;

the detection control apparatus 200 implementing to control an input signal to be output from a set line corresponding to the protection mode information according to the obtained protection mode information comprises:

when the protection mode information obtained by the detection control apparatus 200 is a linear 1+1 protection mode, control a signal transmitted on an active line to be output from the active line; when the obtained protection mode information is a linear 1:1 protection mode, control a signal transmitted on an active line to be output from the active line and a signal transmitted on a standby line to be output from the standby line.

Determining whether an active line is normal based on the detection result may be performed by comparing the power of the signal transmitted on the active line and a magnitude of the set threshold value; if it is lower than the set threshold value, then it is determined that the active line is abnormal; otherwise, the active line is normal. The principle of determining whether a standby line is normal based on detection result is the same as the foregoing.

Figure 2:
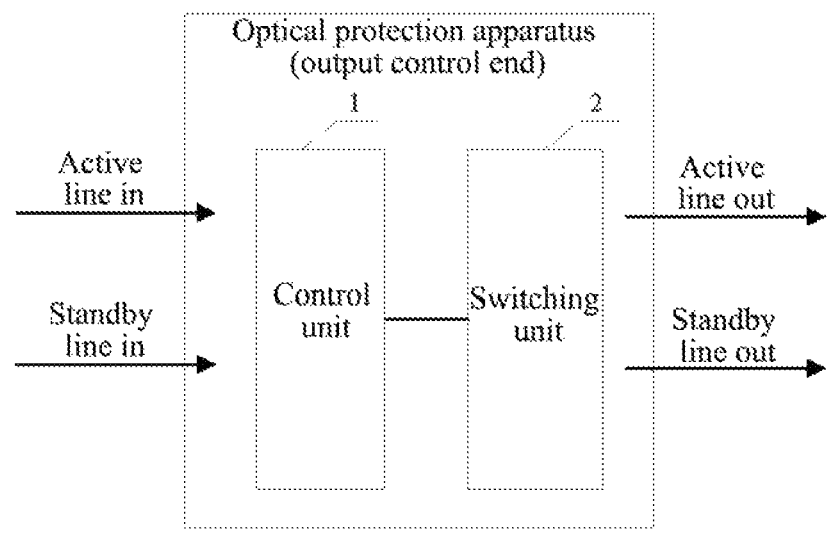
FIG. 2 is a structural diagram 1 of the optical network protection apparatus as an output control end provided in one embodiment of this invention.

FIG. 2 is a structural diagram of the output control apparatus 100 (i.e., as the optical network protection apparatus serves as the detection control end) according to one embodiment of this invention. As shown in FIG. 2, the output control apparatus 100 comprises: a control unit 1 and a switching unit 2; wherein:

the control unit 1 is used to obtain protection mode information configured by the system and instruct the switching unit 2, according to the obtained protection mode information, to control an input signal to be output based on a set line corresponding to the obtained protection mode information;

the switching unit 2 is used to control the output of the signal according to the instruction of the control unit 1.

According to another embodiment of this invention, the control unit 1 implementing to instruct the switch 2 to control an input signal to be output based on a set line corresponding to the protection mode information according to the obtained protection mode information comprises:

when the obtained protection mode information is a linear 1+1 protection mode, instructing the switching unit 2 to control a signal from an input end of the active line to be output respectively from the active line and the standby line; and when the obtained protection mode information is a linear 1:1 protection mode, instructing the switching unit 2 to control a signal from an input end of the active line to be output from the active line and a signal from an input end of the standby line to be output from the standby line.

Figure 3:
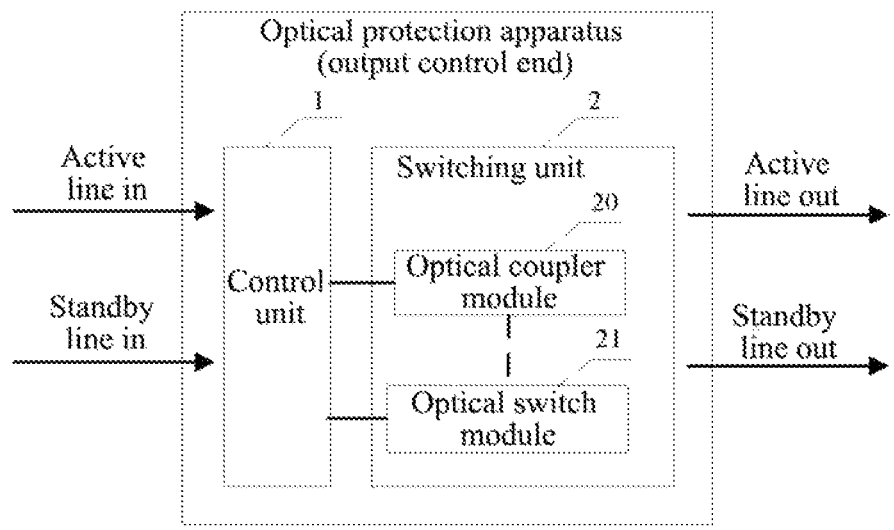
FIG. 3 is a structural diagram 2 of the optical network protection apparatus as an output control end provided in one embodiment of this invention.

FIG. 3 is a more specifically structural diagram of the output control apparatus 100 according to one embodiment of this invention. As shown in FIG. 3, the output control apparatus 100 comprises: a control unit 1; and a switching unit 2 comprising an optical coupler module 20 and an optical switch module 21;

wherein the control unit 1 is connected to the optical coupler module 20 and the optical switch module 21 and, more preferably, the control unit 1 is electrically connected with the optical coupler module 20 and the optical switch module 21 and, more preferably, the optical coupler module 20 and the optical switch module 21 are optically connected; based on the control demand, the connection between the optical coupler module 20 and the optical switch module 21 can be cut off.

Specifically, the control unit 1 is used to output a signal splitting instruction to the optical coupler module 20 and a connection instruction to the optical switch module 21 as the obtained protection mode information is a linear 1+1 protection mode; and to output a signal transmission instruction respectively to the optical coupler module 20 and the optical switch module 21 as the obtained protection mode information is a linear 1:1 protection mode;

the optical coupler module 20 is used to control to split the signals from an input end of the active line to into two paths, and output one path via the active line and provide the other path to the optical switch module 21 when receiving the signal splitting instruction of the control unit 1; and to output the signal from an input end of the active line via the active line when receiving the signal transmission instruction of the control unit 1;

the optical switch module 21 is used to open the connection with the optical coupler module 20 and output a signal transmitted by the optical coupler module 20 via the standby line when receiving the connection instruction of the control unit 1; and to output the signal from an input end of the standby line via the standby line when receiving the signal transmission instruction of the control unit 1.

Figure 4:
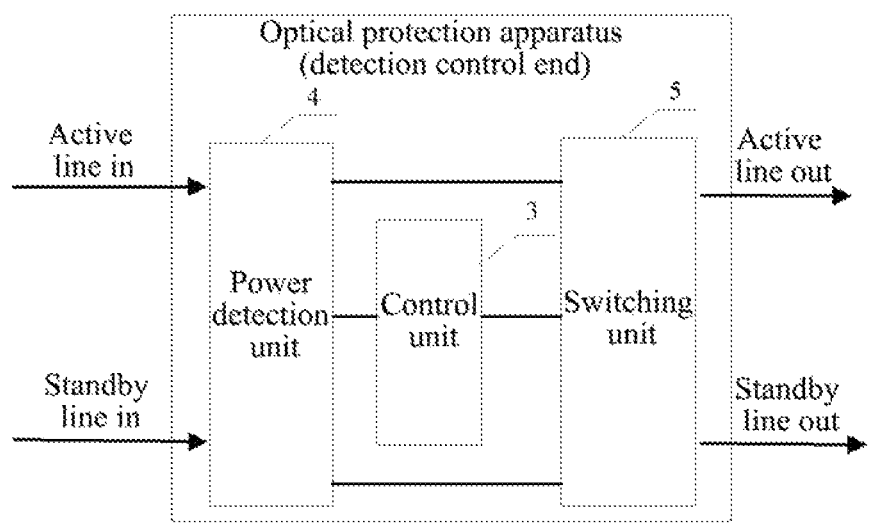
FIG. 4 is a structural diagram 1 of the optical network protection apparatus as a detection control end provided in one embodiment of this invention.

In the above FIG. 3, the control unit 1 may be further configured to not control the optical coupler module 20 according to the obtained protection mode information and only transmit a signal from the input end of the active line to the optical coupler module 20;

correspondingly, the optical coupler module 20 is used to voluntarily split the received signal into two paths, output one path via the active line and provide the other path to the optical switch module 21; to output the signal provided to the optical switch module 21 from the standby line via the optical switch module 21 as establishing the connection between the optical switch module 21 the optical coupler module 20, and make this path of the signal lost as there is no connection between the optical switch module 21 and the optical coupler module 20. FIG. 4 is a structural diagram of the detection control apparatus 200 in one embodiment of this invention. As shown in FIG. 4, it can be seen that the detection control apparatus 200 comprises: a control unit 3, a power detection unit 4 and a switching unit 5; wherein:

the control unit 3 is used to obtain protection mode information configured by the system and instruct the power detection unit 4 to respectively detect powers of signals transmitted on the active line and on the standby line, and instruct the switching unit 5 to control an input signal to be output based on a protection line corresponding to the protection mode information according to the obtained protection mode information if it is determined that the active line is abnormal and the standby line is normal according to the detection result of the power detection unit 4; instruct the switching unit 5 to control an input signal to be output based on a set line corresponding to the protection mode information according to the obtained protection mode information if it is determined that the active line is normal, or that the active line and the standby line are abnormal according to the detection result of the power detection unit 4;

the power detection unit 4 is used to detect powers of signals transmitted on the active line and on the standby line according to the instruction of the control unit 3;

the switching unit 5 is used to control the output of the signal according to the instruction of the control unit 3.

According to another embodiment of this invention, the control unit 3 implementing to instruct the switching unit 5 to control an input signal to be output based on a protection line corresponding to the protection mode information according to the obtained protection mode information comprises:

when the obtained protection mode information is a linear 1+1 protection mode, instructing the switching unit 5 to control a signal transmitted on the standby line to be output from the active line; and when the obtained protection mode information is a linear 1:1 protection mode, instructing the switching unit 5 to control a signal transmitted on the active line to be output from the standby line;

the control unit 3 implementing to instruct the switching unit 5 to control an input signal to be output based on a set line corresponding to the protection mode information according to the obtained protection mode information comprises:

when the obtained protection mode information is a linear 1+1 protection mode, instructing the switching unit 5 to control a signal transmitted on the active line to be output from the active line; and when the obtained protection mode information is a linear 1:1 protection mode, instructing the switching unit 5 to control a signal transmitted on the active line to be output from the active line and a signal transmitted on a standby line to be output from the standby line.

Figure 5:
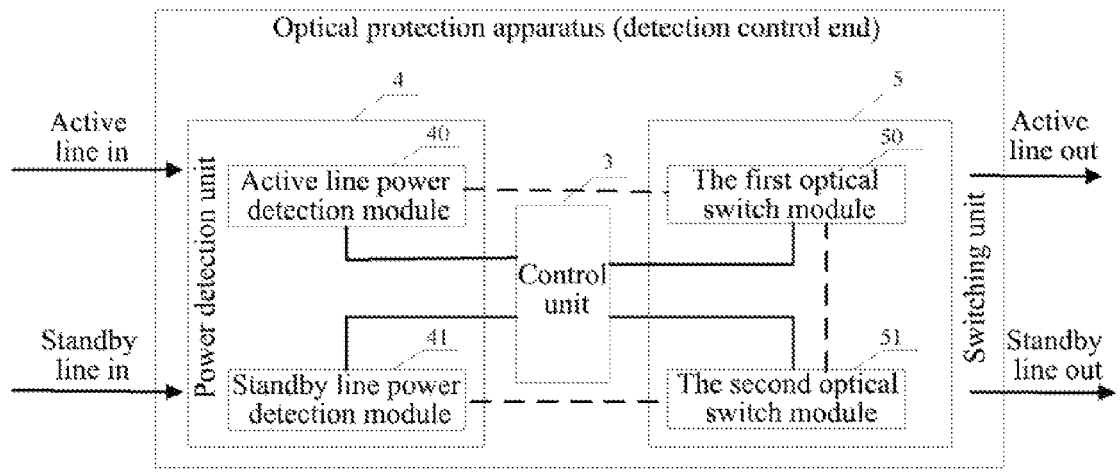
FIG. 5 is a structural diagram 2 of the optical network protection apparatus as a detection control end provided in one embodiment of this invention.

FIG. 5 is a more specifically structural diagram of the detection control apparatus 200 in one embodiment of this invention. As shown in FIG. 5, it can be seen that the detection control apparatus 200 comprises: a control unit 3; a power detection unit 4 comprising a main line power detection module 40 and a standby line power detection module 41; and a switching unit 5 comprising the first optical switch module 50 and the second optical switch module 51;

wherein the control unit 3 is connected respectively with the main line power detection module 40, the standby line power detection module 41, the first optical switch module 50, and the second optical switch module 51 and, more preferably, the control unit 3 is electrically connected with the above main line power detection module 40, the standby line power detection module 41, the first optical switch module 50, and the second optical switch module 51; the main line power detection module 40 is connected with the first optical switch module 50, the standby line power detection module 41 is connected with the second optical switch module 51, the first optical switch module 50 is in connection with the second optical switch module 51 and, more preferably, the main line power detection module 40 is optically connected with the first optical switch module 50, the standby line power detection module 41 is optically connected with the second optical switch module 51, and the first optical switch module 50 is optically connected with the second optical switch module 51. Based on control demands, the connection between the main line power detection module 40 and the first optical switch module 50, the connection between the standby line power detection module 41 and the second optical switch module 51 and the connection between the first optical switch module 50 and the second optical switch module 51 can be cut off.

Specifically, the control unit 3 is specifically used to:

send a power detection instruction respectively to the main line power detection module 40 and the standby line power detection module 41;

if it is determined that the active line is abnormal and the standby line is normal according to the detection results of the main line power detection module 40 and the standby line power detection module 41, and when the obtained protection mode information is a linear 1+1 protection mode, then output the first connection instruction for connecting the standby line power detection module and the first optical switch module 50 to the second optical switch module 51; when the obtained protection mode information is a linear 1:1 protection mode, output the second connection instruction for connecting the main line power detection module 40 and the second optical switch module 51 to the first optical switch module 50;

if it is determined that the active line is normal, or that the active line and the standby line are abnormal according to the detection result by the main line power detection module 40 and the standby line power detection module 41, and when the obtained protection mode information is a linear 1+1 protection mode, output the third connection instruction for connecting the main line power detection module to the first optical switch module 50; and when the obtained protection mode information is a linear 1:1 protection mode, output the third connection indication for connecting the main line power detection module 40 to the first optical switch module 50 and the fourth connection instruction for connecting the standby line power detection module 41 to the second optical switch module 51;

the main line power detection module 40 is used to detect power of the signal transmitted on the active line according to the power detection instruction sent by the control unit 3;

the standby line power detection module 41 is used to detect power of the signal transmitted on the standby line according to the power detection instruction sent by the control unit 3;

the first optical switch module 50 is used to open the connection with the main line power detection module 40 and the second optical switch module 51 and output a signal on the active line transmitted by the main line power detection module 40 from the standby line via the second optical switch module 51 according to the second connection instruction output by the control unit 3, and to open the connection with the main line power detection module 40 and output a signal on the active line transmitted by the main line power detection module 40 from the active line according to the third connection instruction output by the control unit 3;

the second optical switch module 51 is used to open the connection with the standby line power detection module 41 and the first optical switch module 40 and output a signal on a standby line from an active line according to the first connection instruction output by the control unit 3, and to open the connection with the standby line power detection module 41 and output a signal on a standby line from a standby line according to the fourth instruction output by the control unit 3.

The above control unit 3 can work based on a periodic triggering mechanism, that is, periodically sending a power detection instruction to the main line power detection module 40 and the standby line power detection module 41 for detecting signals transmitted on the active line and the standby line and timely switch a service transmitted on the active line to the standby line for transmission as the active line is detected to be abnormal so as to ensure that the services can be transmitted normally, thereby improving the success rate of services.

In practical application, the above main line power detection module 40 and the standby line power detection module 41 can be carried out using a Power Detector (PD) circuit, such as the PIN diode and the like; moreover, the two units can be integrated to one unit. The above optical coupler module 20 can be carried out using the 50/50 fuse-type coupler or other types of couplers such as the optical waveguide-type coupler and the like. The above optical switch module 21, the first optical switch module 50 and the second optical switch module 51 can be carried out using the mechanical optical switch or other types of optical switches such as the Micro-electromechanical Systems (MEMS) and the like. The above control unit 1 and control unit 3 can be carried out using various CPU or Field Programmable Gate Array (FPGA).

The above protection apparatus provided based on the embodiments of this invention describes the processing process in one-way transmission of signals. Certainly, the system provided in the embodiments of this invention also has the processing capacity for bidirectional signal transmission. Accordingly, the output control apparatus shall possess a detection control function with respect to reverse direction signal transmission, that is, completion of reserve transmission of signals as a detection control apparatus. Correspondingly, the detection control apparatus shall possess an output control function with respect to reserve direction signal transmission, that is, completion of reverse transmission of signals as an output control apparatus. That is to say, the optical protection apparatus included in the system provided in the embodiments of this invention might possess output control function and detection control function at the same time.

Figure 6:
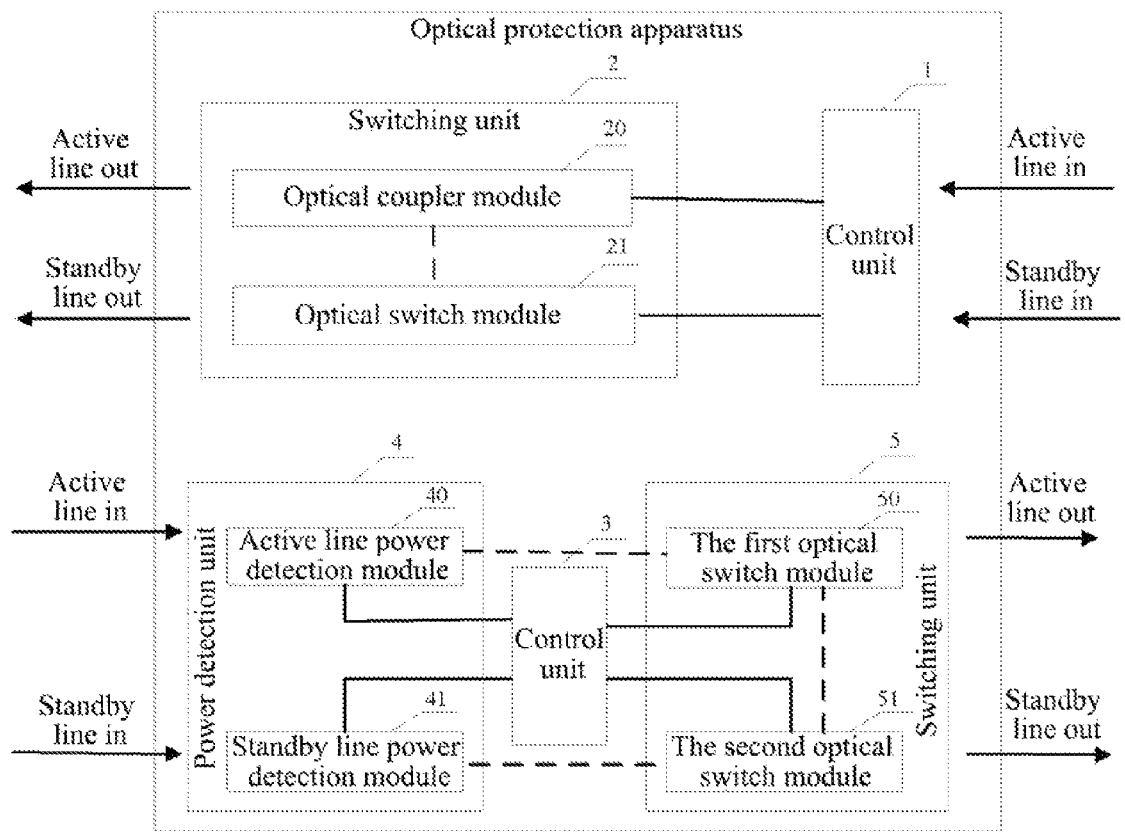
FIG. 6 is a structural diagram of the optical network protection apparatus provided in one embodiment of this invention.

As shown in FIG. 6, the optical protection apparatus provided in the embodiments of this invention possesses a detection control function and an output control function, and comprises a control unit 1, an optical coupler module 20 and an optical switch module 21 as it possesses the detection control function and comprises a control unit 3, a main line power detection module 40, a standby line power detection module 41, the first optical switch module 50, and the second optical switch module 51 as it possesses the output control function; wherein the control unit 1 and the control unit 3 can be integrated into one control unit.

According to one embodiment of this invention, a method for optical network protection is further provided. According to this method, it is possible to flexibly select a protection mode with respect to features of services, thereby satisfying transmission demands of different services.

Figure 7:
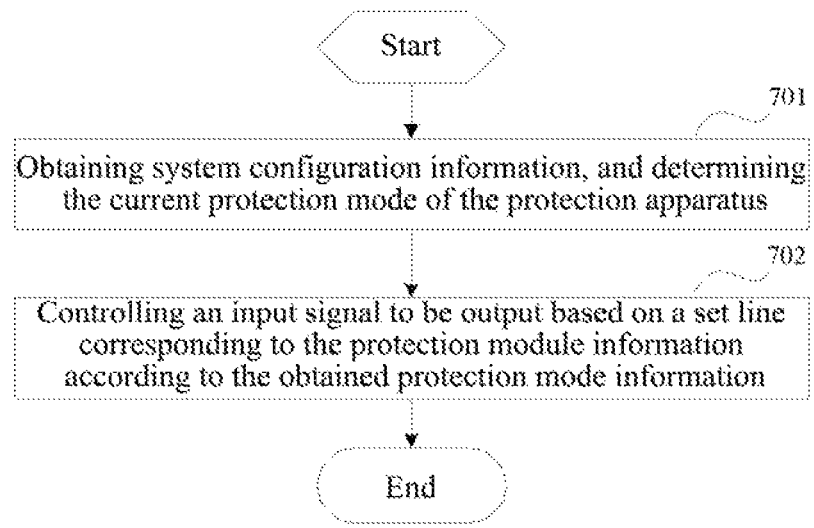
FIG. 7 is a flowchart of output control in a method for optical network protection provided in one embodiment of this invention.

FIG. 7 is a flowchart of the method for optical network protection provided in one embodiment of this invention. As shown in FIG. 7, the method for protection implemented in the output control end comprises the following steps.

Step 701, system configuration information is obtained and the current protection mode of the protection apparatus is determined.

In this step, the protection mode of the protection apparatus is a linear 1+1 protection mode or a linear 1:1 protection mode, which is pre-configured by the system according to features of services to be transmitted.

Step 702, an input signal is controlled to be output based on a set line corresponding to the protection mode information according to the obtained protection mode information.

In this step, when the obtained protection mode information is a linear 1+1 protection mode, a signal from an input end of the active line is controlled to be output respectively from the active line and the standby line; and when the obtained protection mode information is a linear 1:1 protection mode, a signal from an input end of the active line is controlled to be output from the active line and a signal from an input end of the standby line is controlled to be output from the standby line.

The followings makes specific explanations on the implementation process of the above flow in combination with the output control apparatus 100 as shown in FIG. 3 in the above embodiment.

The control unit 1 determines the protection mode information of the protection apparatus and controls transmission of signals, specifically as follows.

Under 1+1 protection mode:

an input end of the active line->control unit 1->optical coupler module 20->active line out;

an input end of active line->control unit 1->optical coupler module 20->optical switch module 21->standby line out.

Under 1:1 protection mode:

an input end of the active line->control unit 1->optical coupler module 20->active line out;

an input end of standby line->control unit 1->optical switch module 21->standby line out.

Figure 8:
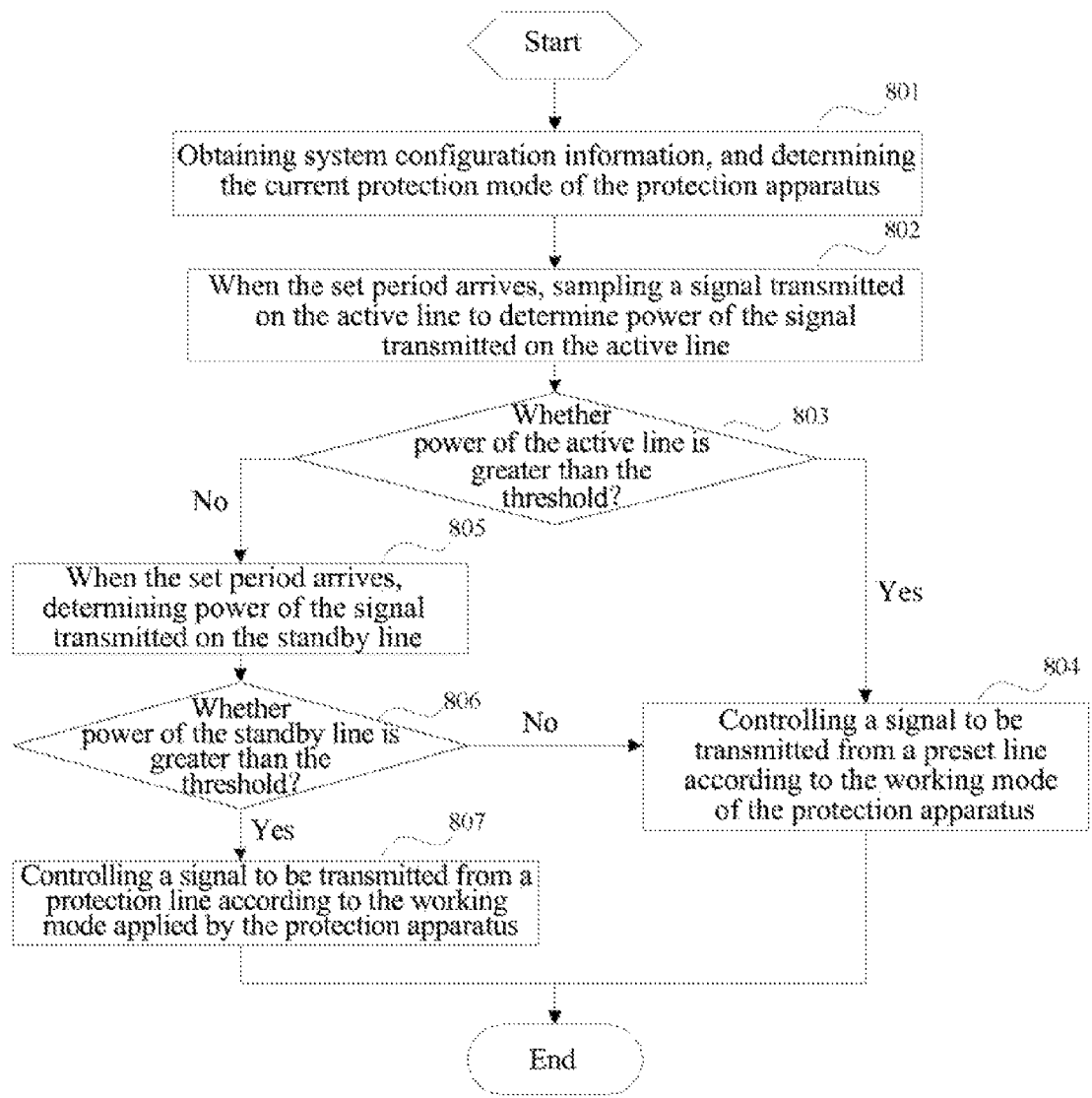
FIG. 8 is a flowchart of detection control in a method for optical network protection provided in one embodiment of this invention.

FIG. 8 is a flowchart of the method for optical network protection provided in one embodiment of this invention. As shown in FIG. 8, the method for protection implemented in the detection control end mainly comprises the following steps.

Step 801, system configuration information is obtained, and the current protection mode of the protection apparatus is determined.

In this step, the protection mode of the protection apparatus is a linear 1+1 protection mode or a linear 1:1 protection mode, which is pre-configured by the system according to features of services to be transmitted.

Step 802, when the set period arrives, a signal transmitted on the active line is sampled to determine power of the signal transmitted on the active line.

In this step, it is also possible to randomly sample a signal transmitted on the active line.

Step 803, it is judged whether power of the signal transmitted on the active line is greater than the set threshold value; if yes, step 804 is performed; otherwise, step 805 is performed.

In this step, if the power of the detected signal is greater than the set threshold value, it is determined that the active line is normal; otherwise, it is determined that the active line is abnormal.

Step 804, an input signal is controlled to be output from a preset line according to the protection mode applied by the protection apparatus.

In this step, if the protection apparatus applies the 1+1 protection mode, a signal from an active line is controlled to be output from the active line and a signal from a standby line is controlled not to be output; if the protection apparatus applies the 1:1 protection mode, a signal from an active line is controlled to be output from the active line and a signal from a standby line is controlled to be output from the standby line.

Step 805, a signal transmitted on the standby line is sampled, and power of the signal transmitted on the standby line is determined.

Step 806, it is judged whether the power of the signal transmitted on the standby line is greater than the set threshold value; if yes, step 807 is performed; otherwise, step 804 is performed.

In this step, if the power of the detected signal is greater than the set threshold value, it is determined that the standby line is normal; otherwise, it is determined that the standby line is abnormal.

Step 807, an input signal is controlled to be output from a protection line according to the protection mode applied by the protection apparatus.

In this step, if the protection apparatus applies the 1+1 protection mode, a signal from the standby line is controlled to be output from the active line and a signal from the active line is controlled not to be output; if the protection apparatus applies the 1:1 protection mode, a signal from the active line is controlled to be output from the standby line and a signal transmitted on the standby line is controlled to be temporarily interrupted and the signal transmitted on the standby link is recovered after the active line recover to be normal.

The followings make specific explanations on the implementation process of the above flow in combination with the detection control apparatus 200 as shown in FIG. 5 of the above embodiment.

The control unit 3 determines the protection mode of the protection apparatus and instructs the main line power detection module 40 and the standby line power detection module 41 to respectively detect power of signals transmitted on the active line and power of signals transmitted on the standby line, and the main line power detection module 40 and the standby line power detection module 41 feed back the detection results to the control unit 3; the control unit 3 controls the working state of the first optical switch module 50 and the second optical switch module 51 based on the detection results of the main line power detection module 40 and the standby line power detection module 41, specifically as follows:

when the control unit 3 determines that the active line works normally, or the active line and the standby line both work abnormally, the internal signal flow of the protection apparatus is:

under the 1+1 protection mode: active line in->main line power detection module 40->the first optical switch module 50->active line out;

under the 1:1 protection mode:

active line in->main line power detection module 40->the first optical switch module 50->active line out;

standby line in->standby line power detection module 41->the second optical switch module 50->standby line out;

when the control unit 3 determines that the active line works abnormally and the standby line works normally, the internal signal flow of the protection apparatus is:

under the 1+1 protection mode:

standby line in->standby line power detection module 41->the second optical switch module 51->the first optical switch module 50->standby line out;

under the 1:1 protection mode:

active line in->main line power detection module 40->the first optical switch module 50->second switch module 51->active line out.

By means of the above at least one technical scheme provided by the invention, an output control end obtains protection mode information configured by system and then controls an input signal to be output based on a set line corresponding to the protection mode information according to the obtained protection mode information, so that it is possible to select a corresponding transmission line according to a protection mode configured by the system and achieve the object to implement to flexibly select a protection mode; an detection control end first obtains protection mode information configured by the system and respectively detects powers of signals transmitted on an active line and a standby line, and timely switches a service to the protection line corresponding to the protection mode for transmission according to the obtained protection mode information as it is determined that the active line is abnormal and the standby line is normal, and thus it ensures the success rate of service transmission on the active line. The apparatus and the system provided by the embodiments of the invention are able to support different protection modes so that different protection modes can be configured according to different features of services to be transmitted in system configuration, thereby satisfying transmission demands of different services.

Obviously, a person skilled in the art may make various modifications and transformations to the invention, without departing from the spirit and scope of the invention. Therefore, the invention is also intended to include these modifications and transformations if these modifications and transformations of the invention fall into a scope of the claims of the invention and equivalent techniques thereof.

Industrial Applicability

By means of the technical scheme provided by the invention, an output control end obtains protection mode information configured by system and then controls an input signal to be output based on a set line corresponding to the protection mode information according to the obtained protection mode information, so that it is possible to select a corresponding transmission line according to a protection mode configured by the system and achieve the object to implement to flexibly select a protection mode; an detection control end first obtains protection mode information configured by the system and respectively detects powers of signals transmitted on an active line and a standby line, and timely switches a service to the protection line corresponding to the protection mode for transmission according to the obtained protection mode information as it is determined that the active line is abnormal and the standby line is normal, and thus it ensures the success rate of service transmission on the active line. The invention is able to support different protection modes so that different protection modes can be configured according to different features of services to be transmitted in system configuration, thereby satisfying transmission demands of different services.

What is claimed is:

1. A system for configuring optical network protection mode, comprising:
   an output control apparatus, which is configured to: obtain protection mode information configured by a system and control an input signal to be output from a set line corresponding to said protection mode information; and
   a detection control apparatus, which is configured to: obtain the protection mode information configured by the system and detect powers of signals transmitted on an active line and on a standby line respectively, and control said input signal to be output from a protection line corresponding to said protection mode information if that said active line is abnormal and said standby line is normal is determined according to a detection result; control said input signal to be output from a set line corresponding to the protection mode information if that said active line is normal is determined or that said active line and said standby line are abnormal according to the detection result is determined;
   thereby the optical network protection mode can be dynamically configured.

2. The system according to claim 1, wherein said output control apparatus is further configured to: control a signal from an input end of the active line to be output respectively from said active line and said standby line when the obtained protection mode information is a linear 1+1 protection mode; and control the signal from the input end of the active line to be output from the active line and the signal from the input end of the standby line to be output from the standby line when the obtained protection mode information is a linear 1:1 protection mode.

3. The system according to claim 1, wherein
   said detection control apparatus is further configured to: when controlling said input signal to be output from the protection line corresponding to said protection mode information, control the signal transmitted on said standby line to be output from said active line when the obtained protection mode information is a linear 1+1 protection mode; and control the signal transmitted on said active line to be output from said standby line when the obtained protection mode information is a linear 1:1 protection mode;
   said detection control apparatus is further configured to: when controlling said input signal to be output from the set line corresponding to said protection mode information, control the signal transmitted on said active line to be output from said active line when the obtained protection mode information is the linear 1+1 protection mode; and control the signal transmitted on said active line to be output from said active line and the signal transmitted on said standby line to be output from said standby line when the obtained protection mode information is the 1:1 protection mode.

4. method for configuring optical network protection mode, comprising:
   obtaining protection mode information configured by a system; and
   controlling an input signal to be output based on a set line corresponding to said protection mode information, thereby the optical network protection mode can be dynamically configured;
   wherein the step of controlling the input signal to be output based on the set line corresponding to said protection mode information comprises:
   when the obtained protection mode information is a linear 1+1 protection mode, controlling a signal from an input end of an active line to be output respectively from the active line and a standby line; and
   when the obtained protection mode information is a linear 1:1 protection mode, controlling said signal from the input end of the active line to be output from said active line and said signal from the input end of the standby line to be output from said standby line.

5. method for configuring optical network protection mode, comprising:
   obtaining protection mode information configured by a system and detecting powers of signals transmitted on an active line and a standby line respectively; and
   if that said active line is abnormal and said standby line is normal is determined according to a detection result, controlling an input signal to be output from a protection line corresponding to said protection mode information; and if that said active line is normal, or that said active line and said standby line are abnormal is determined according to the detection result, controlling said input signal to be output from a set line corresponding to said protection mode information, thereby the optical network protection mode can be dynamically configured.

6. The method according to claim 5, wherein the step of controlling the input signal to be output from the protection line corresponding to said protection mode information comprises:
   if the obtained protection mode information is a linear 1+1 protection mode, controlling the signal transmitted on said standby line to be output from said active line; and
   if the obtained protection mode information is a linear 1:1 protection mode, controlling the signal transmitted on said active line to be output from said standby line.

7. The method according to claim 5, wherein the step of controlling said input signal to be output from the set line corresponding to said protection mode information comprises:
   if the obtained protection mode information is a linear 1+1 protection mode, controlling the signal transmitted on said active line to be output from said active line; and if the obtained -protection mode information is a linear 1:1 protection mode, controlling the signal transmitted on said active line to be output from said active line and the signal transmitted on said standby line to be output from said standby line.

8. An apparatus for configuring optical network protection mode, comprising: a control unit and a switching unit; wherein said control unit is configured to: obtain protection mode information configured by a system and instruct said switching unit to control an input signal to be output from a set line corresponding to said protection mode information;

said switching unit is configured to: control an output of said input signal according to an instruction of said control unit;

such that the optical network protection mode can be dynamically configured;

wherein said control unit is further configured to: when instructing said switching unit to control the input signal to be output from the set line corresponding to said protection mode information, instruct said switching unit to control a signal from an input end of an active line to be output from the active line and a standby line respectively when the obtained protection mode information is a linear 1+1 protection mode; and instruct said switching unit to control the signal from the input end of the active line to be output from said active line and a signal from an input end of the standby line to be output from said standby line when the obtained protection mode information is a linear 1:1 protection mode.

9. The apparatus according to claim 8, wherein said switching unit comprises an optical coupler module and an optical switch module;

said control unit is further configured to: output a signal split instruction to said optical coupler and a connection instruction to said optical switch module when the obtained protection mode information is the linear 1+1 protection mode; and output a signal transmission instruction to said optical coupler module and said optical switch module respectively when the obtained protection mode information is the linear 1:1 protection mode;

said optical coupler module is configured to: control said signal from the input end of the active line to be split into two path, output one path via said active line and provide the another path to said optical switch module when receiving the signal split instruction of said control unit; and output said signal from the input end of the active line via said active line when receiving the signal transmission indication of said control unit;

said optical switch module is configured to: open a connection with said optical coupler module and output a signal transmitted by said optical coupler module via said standby line when receiving the connection instruction of said control unit; and output said signal from the input end of the standby line via said standby line when receiving the signal transmission instruction of said control unit.

10. The apparatus according to claim 8, wherein said switching unit comprises an optical coupler module and an optical switch module;

said control unit is further configured to: transmit said signal from the input end of the active line to said optical coupler module and control said optical switch module according to the protection mode information, output a connection instruction to said optical switch module when the obtained protection mode information is the linear 1+1 protection mode so as to establish a connection between said optical switch module and said optical coupler module; and output a signal transmission instruction to said optical switch module when the obtained protection mode information is the linear 1:1 protection mode so as not to establish a connection between said optical switch module and said optical coupler module or so as to interrupt a connection that has established, and transmit said signal from the input end of the standby line to said optical switch module;

said optical coupler module is configured to: split the received signal into two paths, output one path via said active line and provide the another path to said optical switch module, and output the signal provided to said optical switch module from said standby line when establishing the connection between said optical switch module and said optical coupler module and make the signal provided to said optical switch module lost when there is no connection established between said optical switch module and said optical coupler module;

said optical switch module is configured to: open the connection with said optical coupler module and output the signal from said optical coupler module via said standby line when receiving the connection instruction of said control unit; and output said signal from the input end of the standby line via said standby line when receiving signal transmission instruction of said control unit.

11. An apparatus for configuring optical network protection mode, comprising: a control unit, a power detection unit, and a switching unit; wherein said control unit is configured to: obtain protection mode information configured by a system and instruct said power detection unit to detect powers of signals transmitted on an input active line and a standby line respectively, and instruct said switching unit to control an signal to be output from a protection line corresponding to said protection mode information if that said active line is abnormal and said standby line is normal is determined according to a detection result of said power detection unit; instruct said switching unit to control said input signal to be output from a set line corresponding to said protection mode information if that said active line is normal or that said active line and said standby line are abnormal is determined according to the detection result of said power detection unit;

said power detection unit is configured to: detect powers of signals transmitted on said active line and on said standby line according to an instruction of said control unit;

said switching unit is configured to: control an output of said input signal according to an instruction of said control unit;

such that the optical network protection mode can be dynamically configured.

12. The apparatus according to claim 11, wherein said control unit is further configured to: when instructing said switching unit to control the input signal to be output from the protection line corresponding to said protection mode information, instruct said switching unit to control the signal transmitted on said standby line to be output from said active line when the obtained protection mode information is a linear 1+1 protection mode; and instruct said switching unit to control the signal transmitted on said active line to be output from said standby line when the obtained protection mode information is a linear 1:1 protection mode;

said control unit is further configured to: when instructing said switching unit to control said input signal to be output from the set line corresponding to said protection mode information, instruct said switching unit to control the signal transmitted on said active line to be output from said active line when the obtained protection mode information is the linear 1+1 protection mode; and instruct said switching unit to control the signal transmitted on said active line to be output from said active line and the signal transmitted on said standby line to be output from said standby line when the obtained protection mode information is the linear 1:1 protection mode.

13. The apparatus according to claim 11, wherein said power detection unit comprises: a main line power detection module and a standby line power detection module;

said switching unit comprises a first optical switch module and a second optical switch module;

said control unit is further configured to:

send a power detection instruction respectively to said main line power detection module and said standby line power detection module;

if that said active line is abnormal and said standby line is normal is determined according to detection results of said main line power detection module and said standby line power detection module, output a first connection instruction for connecting said standby line power detection module and said first optical switch module to said second optical switch module when the obtained protection mode information is a linear 1+1 protection mode and output a second connection instruction for connecting said main line power detection and said second optical switch module to said first optical switch module when the obtained protection mode information is a linear 1:1 protection mode;

if that said active line is normal, or that said active line and said standby line are abnormal is determined according to the detection results of said main line power detection module and said standby line power detection module, output a third connection instruction for connecting said main line power detection module to said first optical switch module when the obtained protection mode information is the linear 1+1 protection mode and output a third connection instruction for connecting said main line power detection module to said first optical switch module and a fourth connection instruction for connecting said standby line power detection module to said second optical switch module when the obtained protection mode information is the linear 1:1 protection mode;

said main line power detection module is configured to: detect the power of the signal transmitted on said active line according to the power detection instruction sent by said control unit;

said standby line power detection module is configured to: detect the power of the signal transmitted on said standby line according to the power detection instruction sent by said control unit;

said first optical switch module is configured to: open connections with said main line power detection module and said second optical switch module and output the signal on the active line transmitted by said main line power detection module from said standby line via said second optical switch module according to said second connection instruction output by said control unit, and open the connection with said main line power detection module and output the signal on said active line transmitted by said main line power detection module from said active line according to said third connection instruction output by said control unit;

said second optical switch module is configured to: open connections with said standby line power detection module and said first optical switch module and output said signal from said standby line from said active line according to said first connection instruction output by said control unit; and open the connection with said standby line power detection module and output said signal on said standby line from said standby line according to said fourth instruction output by said control unit.

* * * * *